United States Patent
Corry et al.

(10) Patent No.: US 8,783,036 B2
(45) Date of Patent: Jul. 22, 2014

(54) SYSTEM FOR COOLING SYNGAS

(75) Inventors: Judeth Brannon Corry, Manvel, TX (US); Leroy Omar Tomlinson, Houston, TX (US); James Michael Storey, Houston, TX (US); Paul Stephen Dimascio, Greer, SC (US); Mark Joseph Steffen, Louisville, KY (US); Wei Chen, Sugar Land, TX (US); Benjamin Campbell Steinhaus, Houston, TX (US); Richard Anthony De Puy, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 12/939,937

(22) Filed: Nov. 4, 2010

(65) Prior Publication Data

US 2012/0111009 A1 May 10, 2012

(51) Int. Cl.
*F01K 23/04* (2006.01)
*F01K 23/06* (2006.01)
*F01K 17/00* (2006.01)
*C01B 3/36* (2006.01)
*C10J 3/46* (2006.01)
*C10J 3/54* (2006.01)

(52) U.S. Cl.
USPC ................. 60/655; 60/670; 60/648; 48/197 R

(58) Field of Classification Search
USPC ............... 60/645–681; 48/61, 76, 67, 69, 74, 48/127.9, 98–101, 197 R
See application file for complete search history.

(56) References Cited

U.S. PATENT DOCUMENTS

| 4,099,382 | A | * | 7/1978 | Paull et al. | 60/648 |
| 4,099,383 | A | * | 7/1978 | Paull et al. | 60/648 |
| 4,173,254 | A | * | 11/1979 | Paull et al. | 165/134.1 |
| 4,178,758 | A | * | 12/1979 | Paull et al. | 60/648 |
| 4,184,322 | A | * | 1/1980 | Paull et al. | 60/780 |
| 4,799,356 | A | * | 1/1989 | Doering | 60/648 |
| 5,251,433 | A | * | 10/1993 | Wallace | 60/775 |
| 5,713,312 | A | | 2/1998 | Waryasz | |
| 5,842,345 | A | * | 12/1998 | Scharpf | 60/649 |
| RE36,497 | E | | 1/2000 | Tomlinson | |
| RE36,524 | E | | 1/2000 | Tomlinson | |
| 6,032,468 | A | | 3/2000 | Fetescu et al. | |
| 7,621,133 | B2 | | 11/2009 | Tomlinson et al. | |
| 2008/0289313 | A1 | * | 11/2008 | Batscha et al. | 60/39.5 |

FOREIGN PATENT DOCUMENTS

JP 5018265 A 1/1993
WO 2007055930 A2 5/2007

OTHER PUBLICATIONS

U.S. Appl. No. 12/754,391, filed Apr. 5, 2010, Benjamin Campbell Steinhaus.
EP Search Report and Opinion dated Apr. 19, 2012 from corresponding EP Application No. 11187146.3.

* cited by examiner

*Primary Examiner* — Christopher Jetton
(74) *Attorney, Agent, or Firm* — Fletcher Yoder P.C.

(57) ABSTRACT

A system includes a syngas cooler configured to cool a syngas. The syngas cooler includes a first syngas cooler section configured to cool the syngas and a second syngas cooler section configured to cool the syngas and generate a first superheated steam with an enthalpy of less than approximately 3800 kJ/kg.

17 Claims, 4 Drawing Sheets

SYSTEM FOR COOLING SYNGAS

BACKGROUND OF THE INVENTION

The subject matter disclosed herein relates to gasification systems and, more particularly, to systems for cooling syngas.

A plant, such as a power plant, has many components that waste heat and/or consume energy to generate heat. A gasifier converts carbonaceous materials into a mixture of carbon monoxide and hydrogen, referred to as synthesis gas or syngas. The syngas may be used for power generation, chemical production, or any other suitable application. Prior to use, the syngas may be cooled in a syngas cooler and treated in a gas treatment system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a syngas cooler configured to cool a syngas. The syngas cooler includes a first syngas cooler section configured to cool the syngas and a second syngas cooler section configured to cool the syngas and generate a first superheated steam with an enthalpy of less than approximately 3800 kJ/kg.

In a second embodiment, a system includes a gas fuel cooler configured to cool a gas fuel for power generation. The gas fuel cooler includes a first gas fuel cooler section configured to cool the gas fuel and generate a first superheated steam, a second gas fuel cooler section configured to cool the gas fuel and generate a second superheated steam, a first steam connector configured to output the first superheated steam through a first output independent from the second gas fuel cooler section, and a second steam connector configured to output the second superheated steam through a second output independent from the first gas fuel cooler section.

In a third embodiment, a system includes a gas cooler configured to cool a gas. The gas cooler includes an elongated enclosure having a longitudinal flow path and a first gas cooler section disposed in the elongated enclosure. The first gas cooler section is configured to cool the gas. The gas cooler also includes a second gas cooler section disposed in the elongated enclosure. The second gas cooler section is configured to cool the gas and generate a first superheated steam. Finally, the gas cooler includes an after cooler section disposed in the elongated enclosure. The first gas cooler section, the second gas cooler section, and the after cooler section are disposed in series one after another along the longitudinal flow path. The second gas cooler section is disposed axially between the first gas cooler section and the after cooler section along the longitudinal flow path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
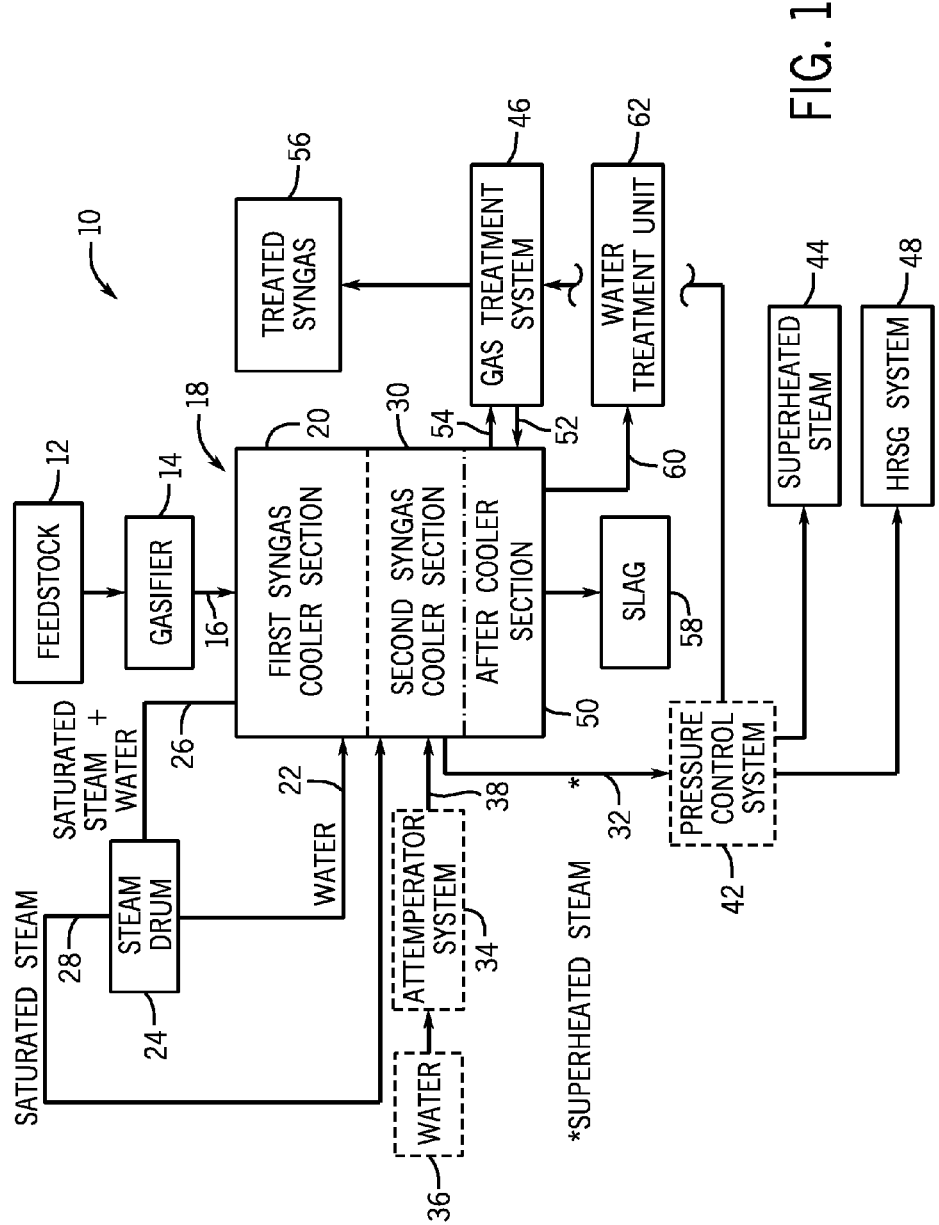
FIG. 1 is a block diagram of a portion of a gasification system incorporating a syngas cooler according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include systems directed toward gas coolers that are configured to cool a gas, while evaporating a liquid, such as water, and superheating the resulting vapor, such as steam. More specifically, certain embodiments include gas fuel coolers configured to cool a gas fuel. For example, some embodiments include a syngas cooler configured to cool a syngas. In other words, the syngas cooler utilizes the heat generated during gasification to integrally provide superheated steam. The syngas cooler may include one or more different sections to cool the syngas, wherein at least one of these sections is a superheater. For example, the syngas cooler may include a first syngas cooler section that is configured to cool the syngas. Specifically, the first syngas cooler section may use water to cool the syngas. The heat from the hot syngas may boil the water in the first syngas cooler section to generate a saturated steam, which is defined as steam at equilibrium with liquid water. Thus, the output from the first syngas cooler section may include both the saturated steam and water. The saturated steam from the first syngas cooler section may be used as a source of heat elsewhere in the plant and/or as a supply for a second syngas cooler section as discussed below. However, the pressure of the saturated steam may be greater than what is needed elsewhere in the plant. Thus, the saturated steam may be depressurized, or let down, prior to being used in the other sections of the plant. Whether the saturated steam is flowing through piping or controlled with a valve, for example, if the saturated stem is above approximately 3.1 MPa, the use of such saturated steam may result in the formation of water that may negatively affect steam-handling piping and equipment.

The syngas cooler may also include a second syngas cooler section that is configured to cool the syngas and generate a first superheated steam. For example, the second syngas cooler section may use the saturated steam from the first syngas cooler section to cool the syngas. The heat from the hot syngas may increase a temperature of the saturated steam and generate the first superheated steam, which is defined as steam at a temperature higher than the boiling point of water. The first superheated steam from the second syngas cooler section may be used as a source of heat elsewhere in the plant. For example, the first superheated steam may be output to an input of a heat recovery steam generation (HRSG) system, a gas treatment system (e.g., an acid gas removal system), a polygen system, a methanation system, a carbon capture system, a vapor absorption cycle (VAC) system, a process heat exchanger, a reactor, an attemperator, or any combination thereof. The first superheated steam may be at a pressure higher than is needed elsewhere in the plant. If the pressure of the first superheated steam is greater than approximately 3.1 MPa, the enthalpy of the first superheated steam must be greater than the enthalpy of saturated steam at approximately 3.1 MPa (approximately 2811 kJ/kg) so that depressurization of the first superheated steam does not condense water. Thus, the depressurization of the first superheated steam may reduce or eliminate the possibility of water damage to the steam-handling equipment and reduce the costs associated with moisture-removal systems. In some embodiments, the syngas cooler may include one or more cooler sections configured to cool the syngas and generate additional superheated steam streams. The pressure and/or temperature of these additional superheated steam streams may be different from one another. Thus, a single syngas cooler may be configured to provide different superheated steam streams at conditions appropriate for different sections of the plant. In some embodiments, the syngas cooler may include an after cooler section, which may be configured to provide further cooling of the syngas and remove particulates from the cooled syngas. The one or more syngas cooler sections configured to generate superheated steam may be disposed in between the first syngas cooler section and the after cooler section.

FIG. 1 is a diagram of a portion of a gasification system 10 that produces syngas and a superheated steam. For example, the gasification system 10 may be part of a chemical production gasification plant or a power plant, such as an integrated gasification combined cycle (IGCC) power plant. For example, the gasification system 10 may include an embodiment of a syngas cooler 18, which is configured to cool the syngas and generate the superheated steam. In other embodiments, the syngas cooler 18 may be a gas fuel cooler or, more generally, a gas cooler. In addition, in various embodiments, the syngas cooler 18 may include, but is not limited to, a radiant syngas cooler, a convective syngas cooler, a water jacketed gasifier, a convective cooler, a water wall cooler, a fired-tube cooler, a heat exchanging device, and so forth. In the illustrated embodiment, a feedstock 12, which may be a solid or a liquid, is used to feed the gasification system 10. The feedstock 12 may include coal, petroleum coke, oil, biomass, wood-based materials, agricultural wastes, tars, coke oven gas and asphalt, or other carbon containing items. Next, the feedstock 12 is injected into a gasifier 14, which converts the feedstock 12 into syngas 16 (e.g., a combination of carbon monoxide (CO), carbon dioxide ($CO_2$), and hydrogen). This conversion may be accomplished by subjecting the feedstock 12 to a controlled amount of water and oxygen at elevated pressures. The gasification process may generate a solid (e.g., char) and gases (e.g., CO, $CO_2$, hydrogen, water, and nitrogen). In various embodiments, the gasifier 14 may be an upflow or downflow gasifier 14. In addition, the gasifier 14 may include single or multiple nozzles for the feedstock 12, oxidant (e.g. oxygen), and/or moderator (e.g., steam). In other embodiments, non-gasification processes may be used to produce the syngas 16. For example, a coke oven or other processes may generate the syngas 16.

The output or syngas 16 from the gasifier 14 is sent to a syngas cooler 18, which is configured to cool the syngas while generating a superheated steam in the illustrated embodiment. The syngas cooler 18 may include one or more sections, wherein at least one section includes a superheater. Each section of the syngas cooler 18 is configured as a heat exchanger, such as a shell-and-tube heat exchanger. For example, the syngas cooler 18 may include a first syngas cooler section 20, which may use water 22 from a steam drum 24 to cool the syngas 16 from the gasifier 14. In certain embodiments, the heat from the syngas 16 passing through a shell may cause the water 22 passing through one or more tubes to boil, thereby producing a saturated steam. In other embodiments, the syngas 16 may pass through one or more tubes and the water 22 may pass through a shell. However, any suitable heat exchanger and configuration of flow paths may be used for the first syngas cooler section 20. In certain situations, not all of the water 22 in the first syngas cooler section 20 boils, resulting in a mixture 26 of saturated steam and water, which may be directed from the first syngas cooler section 20 to the steam drum 24. Other embodiments may include more than one steam drum 24. The steam drum 24 may be a pressure vessel used to separate the liquid and gas phases of the mixture 26 of saturated steam and water. Specifically, the water 22 may accumulate near a bottom of the steam drum 24 and be directed back to the first syngas cooler section 20. A saturated steam 28, relatively free of water, may accumulate near a top of the steam drum 24. If the saturated steam 28 is above approximately 3.1 MPa, a decrease in a pressure and/or a temperature of the saturated steam 28 that causes the enthalpy of the saturated steam 28 to fall below approximately 2811 kJ/kg will result in the formation of liquid water.

In certain embodiments, the saturated steam 28 may be used as a coolant in a second syngas cooler section 30. The cooled syngas 16 from the first syngas cooler section 20 may not be completely cooled. Thus, the syngas 16 passing through the second syngas cooler section 30 may result in an increase in a temperature of the saturated steam 28 passing through the cooler section 30, creating a superheated steam 32. In certain embodiments, the second syngas cooler section 30 may be configured to superheat coolants other than saturated steam 28. As with the first syngas cooler section, 20, the syngas 16 may pass through a shell or one or more tubes of the second syngas cooler section 30, for example. The temperature of the superheated steam 32 produced from the second syngas cooler section 30 may be higher than that used by downstream processes. Several factors may influence the temperature of the superheated steam 32 including, but not limited to, a composition, flow rate, and/or temperature of the syngas 16, heat transfer characteristics of the second syngas cooler section 30, and so forth. In addition, the temperature of the superheated steam 32 may exceed design temperatures of certain components of the second syngas cooler section 30. Thus, an attemperator system 34 may be used to reduce the temperature of the superheated steam 32. The attemperator system 34 is supplied water 36. The attemperator system 34 reduces the temperature of the superheated steam 32 by bringing the superheated steam 32 into direct contact with injected water 38. The superheated steam 32 is cooled through the evaporation of the injected water 38. In other embodiments, other systems may be used to cool the superheated steam 32. For example, a desuperheater may be used in place of the attemperator system 34. In further embodiments, the attemperator system 34 may be omitted. Thus, the attemperator system 34 and the water 36 are shown dashed in FIG. 1. In such embodiments, the second syngas cooler section 30 may include one or more independent outputs configured to output a plurality of superheated steam flows for use in external applications. For example, the superheated steam 32 may be a first independent output. A portion of the superheated steam 32 directed back to the second syngas cooler section 30 for further superheating may result in a second independent output of superheated steam 32.

In addition, the enthalpy of the superheated steam 32 may be limited by the configuration of the second syngas cooler section 30. For example, factors such as, but not limited to, the heat transfer area, tube arrangement, tube number, tube diameters, tube wall thicknesses, baffle arrangement, baffle number, baffle spacing, flow rates, temperatures, pressures, and so forth, may be used to configure the second syngas cooler section 30. Specifically, in certain embodiments, the enthalpy of the superheated steam 32 may be less than approximately 3800 kJ/kg. Such superheated steam 32 may be sent directly to steam turbines. In other embodiments, the enthalpy of the superheated steam 32 may be less than approximately 3140 kJ/kg, which may be less than a minimum enthalpy threshold for supply to steam turbines. In other words, steam turbines may be supplied superheated steam with enthalpies greater than approximately 3140 kJ/kg to operate properly. Thus, in such embodiments, the second syngas cooler section 30 is not configured to output the superheated steam 32 to a steam turbine. In other words, the superheated steam 32 of such embodiments may be used for heat transfer generally, but not for power generation. In other embodiments, the enthalpy of the superheated steam 32 may be between approximately 2811 kJ/kg and 3024 kJ/kg. Again, such an enthalpy range is less than the minimum enthalpy threshold for steam turbines. In addition, steam with an enthalpy greater than approximately 2811 kJ/kg can only exist as superheated steam. In other words, depressurization of superheated steam 32 with an enthalpy greater than approximately 2811 kJ/kg will not result in condensation of water. Thus, the superheated steam 32 can be transported through piping, throttled, and so forth without causing water formation, which can cause damage to steam-handling equipment. Thus, the superheated steam 32 provides control of a pressure of the steam drum 24 while simultaneously providing integration with the downstream processes, without the need for downstream treatment. A capacity of the second syngas cooler section 30 is defined as the enthalpy required, as may be shown on a Mollier diagram, so that any pressure reduction or entropy increase maintains only the vapor phase for the steam produced. In practice, it may be desirable for the pressure-reduced steam to be saturated, that is, on the saturation line of the Mollier diagram.

Before being used in the downstream processes of the gasification system 10, the superheated steam 32 generated from cooling the syngas 16 may pass through a pressure control system 42, which controls the pressure of the steam drum 24 and/or depressurizes the superheated steam 32. For example, the pressure control system 42 may include, but is not limited to, a steam letdown valve, a control valve, a restriction orifice, or any other suitable pressure reduction device. A single pressure control system 42 may be used to control the pressure of the steam drum 24 and/or depressurize the superheated steam 32 that is output to an input of one or more downstream processes of the gasification system 10 as shown in FIG. 1. For example, the superheated steam 32 may be between approximately 3,100 kPa to 19,300 kPa, 9,650 kPa to 16,500 kPa, or 12,400 kPa to 14,500 kPa, and between approximately 235 degrees Celsius to 704 degrees Celsius, 310 degrees Celsius to 350 degrees Celsius, or 330 degrees Celsius to 340 degrees Celsius, respectively. The specific conditions of the superheated steam 32 may depend on a variety of factors including, but not limited to, a composition, flow rate, temperature, and/or pressure of the syngas 16, a flow rate, temperature, and/or pressure of the saturated steam 28, operating conditions of the attemperator system 34, configuration of the second syngas cooler section 30, and so forth. Thus, the conditions of the superheated steam 32 may vary in different embodiments. Moreover, the conditions of the superheated steam 32 may change during operation of the gasifier 14 in response to process changes in the gasifier 14 or elsewhere in the gasification system 10.

In certain embodiments, a valve in the stream to the HRSG system 48 controls the pressure of the steam drum 24 and a valve in the superheated steam 44 controls the downstream pressure of the superheated steam 44. The pressure of the stream to the HRSG system 48 downstream of the control valve is controlled by the power cycle. Specifically, the pressure controlled superheated steam 44 may be between approximately 2.1 MPa to 13.8 MPa, 3.4 MPa to 12.4 MPa, or 4.1 MPa to 10.3 MPa. The degree of superheat (difference between superheated temperature and saturated temperature) of the superheated steam 44 could be between approximately 3 degrees Celsius to 360 degrees Celsius, 3 degrees Celsius to 200 degrees Celsius, or 3 degrees Celsius to 28 degrees Celsius. The degree of superheat of the superheated steam 44 may be moderated as desired by the downstream process, using, for example, an attemperator. Thus, in certain embodiments, the percent pressure reduction from upstream to downstream of the pressure control system 42 may be between approximately 5 percent to 90 percent, 10 percent to 75 percent, or 25 percent to 50 percent. The specific conditions of the pressure controlled superheated steam 44 may depend on the conditions of the incoming superheated steam 32 and/or the operating conditions of the pressure control system 42. Thus, the conditions of the superheated steam 44 may vary during operation of the pressure control system 42. Moreover, the pressure control system 42 may be configured to produce multiple, different pressures and/or temperatures of superheated steam 44 for different applications. In other embodiments, one or more pressure control systems 42 may be used for each of the downstream processes of the gasification system 10. Examples of downstream processes of the gasification system 10 include, but are not limited to, a gas treatment system 46, a heat recovery steam generation (HRSG) system 48, a process heat exchanger, a reactor, an attemperator, or a combination thereof. In other words, the superheated steam 44 may be output to any component of a power generation system. For example, the superheated steam 44 may be output to the HRSG system 48 to be further superheated and then supplied to a steam turbine. In other embodiments, the superheated steam 44 may be output directly to the steam turbine. In further embodiments, the pressure control system 42 may be omitted. Thus, the pressure control system 42 is shown dashed in FIG. 1. In other words, the superheated steam 32 may be used directly in the HRSG system 48, the gas treatment system 46, or other downstream processes, without pressure control and with little to no pressure drop. In other embodiments, the pressure control system 42 may not be used for all downstream processes. For example, the pressure control system 42 may be used for the gas treatment system 46, but the superheated steam 32 may be used directly in the HRSG system 48, without pressure control.

The syngas cooler 18 may also include an after cooler section 50, which may be configured to remove particulates from the syngas 16 and provide further cooling of the syngas 16, as described in more detail below. Examples of after cooler sections 50 include, but are not limited to, quench systems, spray quench systems, convective coolers, and so forth. In some embodiments of the after cooler section 50, there is direct contact between the syngas 16 and a coolant and in other embodiments, there is no direct contact. In certain embodiments of the syngas cooler 18, the after cooler section 50 is omitted. In the illustrated embodiment, the second syngas cooler section 30 is located between the first syngas cooler section 20 and the after cooler section 50. The after cooler section 50 may be connected to the gas treatment system 46, to exchange water stream 52 and cooled syngas 54. Specifically, the water stream 52 may be directed from the gas treatment system 46 to the after cooler section 50. The syngas 54 exiting the after cooler section 50 may be treated in the gas treatment system 46 to produce a treated syngas 56, which may be used for power generation, chemical production, or various other applications in the system 10. Particulates in the syngas 16 may accumulate in the after cooler section 50 and may be removed as a slag 58. In addition, a portion of the water 60 in the after cooler section 50 may be directed to a water treatment unit 62 for further processing before being reused in the after cooler section 50, or elsewhere in the gasification system 10.

Figure 2:
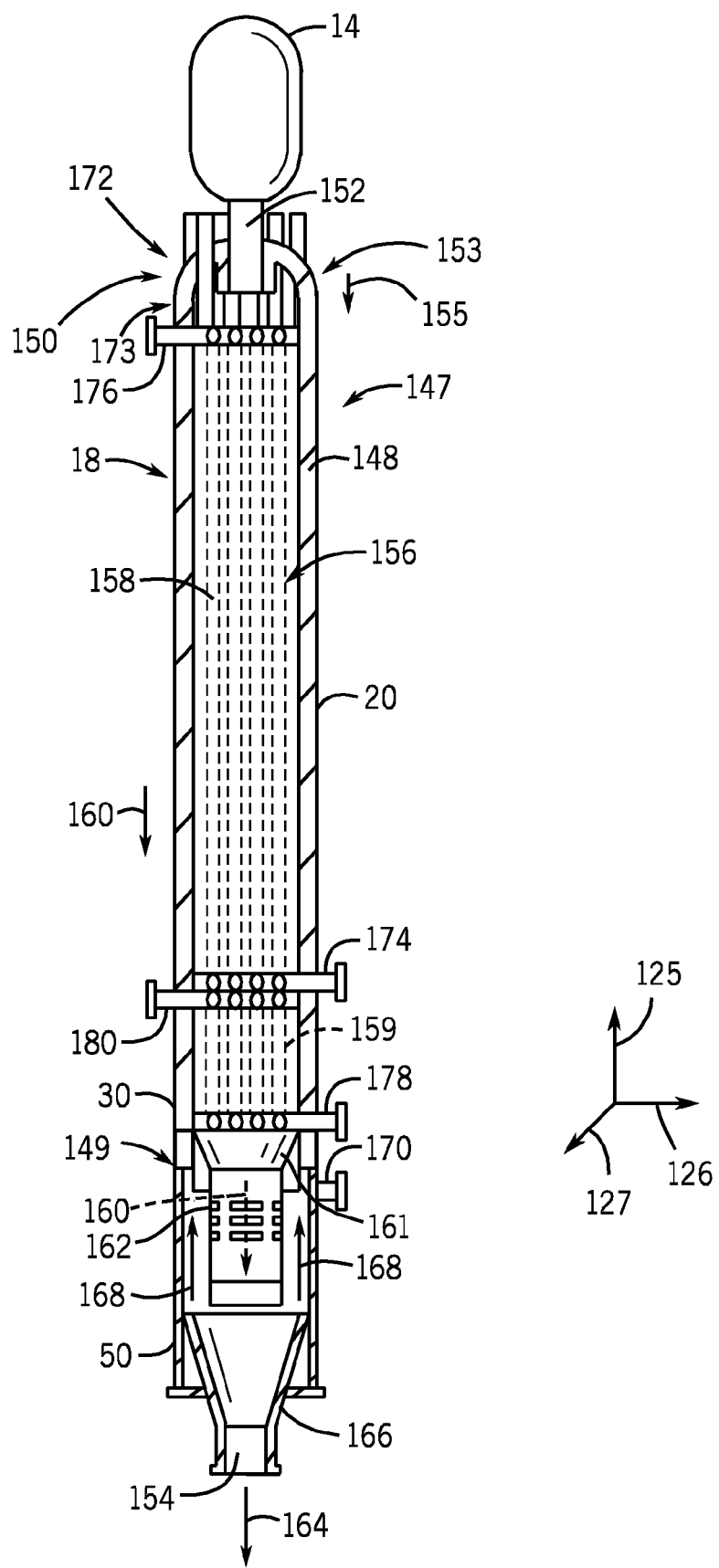
FIG. 2 is a cross-sectional side view of an embodiment of a syngas cooler.

FIG. 2 is a cross-sectional side view of an embodiment of the syngas cooler 18 for use with the gasification system 10. The syngas cooler 18 may have an axial, or longitudinal, axis 125, a radial axis 126, and a circumferential axis 127. The syngas cooler 18 may include a vessel 148, which may be made of a suitable material, such as, but not limited to, low alloy steels, chrome molybdenum alloy steels, and so forth. The vessel 148 functions as a housing or outer casing for the syngas cooler 18, enclosing both an upper region 147 of the syngas cooler 18 as well as a lower region 149 of the syngas cooler 18. The vessel 148 may be elongated along the axial axis 125. The upper region 147 of the syngas cooler 18 may include a dome-shaped portion 150 that includes an inlet 152 extending into a throat 153. The lower region 149 includes an outlet 154. An interior region 156 is defined by the space between the inlet 152 and the outlet 154. The throat 153, which is adjacent the inlet 152, expands in a downstream direction 155 from the inlet 152 toward the outlet 154.

The interior region 156 houses the first syngas cooler section 20, the second syngas cooler section 30, and the after cooler section 50, which is configured as a quench section in FIG. 2. The first and second syngas cooler sections 20 and 30 include respective tubing 158 and 159, which may extend in the axial direction 125, the radial direction 126, and/or the circumferential direction 127. In certain embodiments, the tubing 158 and 159 may include internal or external fins, coatings, grooves, or other features to increase a surface area of the tubing 158 and 159. Liquid, such as water 22, may flow through the tubing 158 of the first syngas cooler section 20. Saturated steam 28 may flow through the tubing 159 of the second syngas cooler section 30. Thus, the tubing 158 and 159 may act as heat exchangers within the syngas cooler 18, and may circulate the coolant to an external heat exchanger for removal of heat. Accordingly, the tubing 158 and 159 may be made of a thermally conductive material suitable for use with hot syngas, such as, but not limited to, nickel iron chromium alloy steels and so forth. Other examples of materials that may be used for the tubing 158 and 159 include, but are not limited to, refractory materials, refractory metals, non-metallic materials, coatings, clays, ceramics, cermets, MCrAlY (chromium aluminum yttrium) coatings (where M=cobalt, nickel, or cobalt/nickel) and oxides of aluminum, silicon, magnesium, and calcium.

During operation, the syngas 16 generated in the gasifier 14 may generally flow in a downward manner parallel to the tubing 158 and 159 as indicated by arrows 160, which may constitute a longitudinal flow path through the syngas cooler 18. That is, the syngas 16 flows through a gas passage of the syngas cooler 18 that extends in the flow direction 160 lengthwise along the vessel 148. Accordingly, the syngas 16 enters the first syngas cooler section 20 through the inlet 152, flows lengthwise through the interior region 156 of the first syngas cooler section 20, flows lengthwise through the interior region 156 of the second syngas cooler section 30, flows through the after cooler section 50, and then exits the syngas cooler 18 through a syngas outlet 170. In other words, the first and second syngas cooler sections 20 and 30 may be disposed in series one after another along the axial axis 125. In addition, the second syngas cooler section 30 may be disposed axially between the first syngas cooler section 20 and the after cooler section 50. In this manner, the syngas 16 may sequentially contact the tubing 158 and 159 of the syngas cooler 18 and the fluid flowing through the tubing 158 and 159 may act to cool the syngas 16 as it travels through the syngas cooler 18. Because of this cooling process, saturated steam 26 may be generated in the tubing 158 of the first syngas cooler section 20, and superheated steam 32 may be generated in the tubing 159 of the second syngas cooler section 30. In other embodiments, the syngas 16 may flow in an upward manner, opposite to that indicated by arrows 160, or the syngas 16 may flow in a generally horizontal manner. In embodiments where the syngas 16 flows in an upward manner, the first syngas cooler section 20 may be located below the second syngas cooler section 30. In further embodiments, the tubing 159 of the second syngas cooler section 30 may be disposed in an exit cone 161 located above the after cooler section 50. For example, the tubing 159 may wrap helically around the exit cone 161.

The syngas cooler 18 may also include a conduit 162 in the lower region 149 of the syngas cooler 18 (e.g., after cooler section 50) that may aid in directing the cooled syngas 16 and slag 58 out of the syngas cooler 18. For example, as the slag 58 exits the conduit 162, the slag 58 may flow in a generally downward direction 164 to exit the syngas cooler 18 via a quench cone 166 of the after cooler section 50. In contrast, the cooled syngas 16 may flow in a general upward direction 168 toward the syngas outlet or transfer line 170 as the cooled syngas exits the conduit 162. The transfer line 170 may be used to transmit the syngas to the gas treatment system 46. The untreated syngas 16 may corrode elements of the syngas cooler 18, such as the tubing 158 and 159 and/or the inner wall of the vessel 148, if these elements were to be exposed to the untreated syngas 16. Accordingly, a gas inlet 172 may transmit a non-corrosive fluid, such as a shielding gas 173 (e.g., nitrogen), to the syngas cooler 18. This non-corrosive fluid may flow generally downward between the vessel 148 and the tubing 158 and 159 of syngas cooler 18 to form a protective barrier, for example, against syngas migration into the annular space between the tubes 158 and 159 and the vessel 148.

In the illustrated embodiment, the tubing 158 and 159 is oriented parallel to the axial axis 125. In addition, the first syngas cooler section 20 includes a first syngas cooler section inlet header 174, or first input, that may be located near a bottom of the first syngas cooler section 20. A first syngas cooler section outlet header 176, or first output, may be located near a top of the first syngas cooler section 20. Thus, the water 22 may enter the inlet header 174 and move in an upward manner opposite to the direction indicated by arrows 160. The mixture 26 of saturated steam and water exits the outlet header 176. In other embodiments, the first syngas cooler section 20 may be configured with the water 22 entering near the top of the first syngas cooler section 20 (e.g., header 176) and the mixture 26 of saturated steam and water exiting near the bottom of the first syngas cooler section 20 (e.g., header 174).

Similarly, the second syngas cooler section 30 may include a second syngas cooler section inlet header 178, or second input, and a second syngas cooler section outlet header 180, or second output. Thus, the saturated steam 28 may enter the inlet header 178, flow in a direction opposite to that of arrows 160, and superheated steam 32 may exit the outlet header 180. In other words, the first output of the first syngas cooler section 20 may be coupled to the second input of the second syngas cooler section 30. In other embodiments, the direction of the saturated steam 28 through the second syngas cooler section 30 may be reversed. In other words, the saturated steam 28 may flow in the direction of arrows 160. As with the tubing 158 of the first syngas cooler section 20, the tubing 159 of the second syngas cooler section 30 may be oriented parallel to the axial axis 125.

Figure 3:
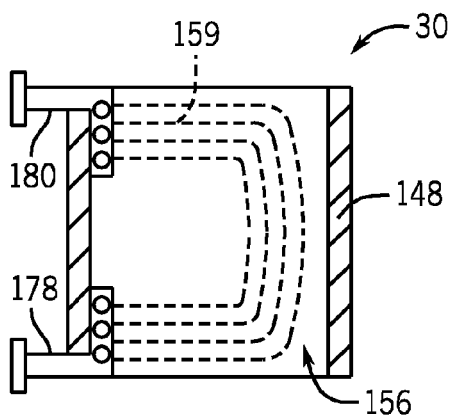
FIG. 3 is a cross-sectional side view of a portion of an embodiment of a syngas cooler.
Figure 4:
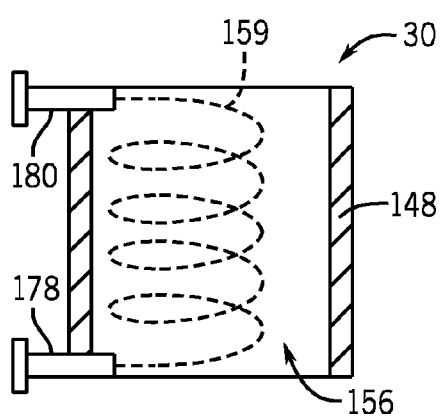
FIG. 4 is a cross-sectional side view of a portion of an embodiment of a syngas cooler.
Figure 5:
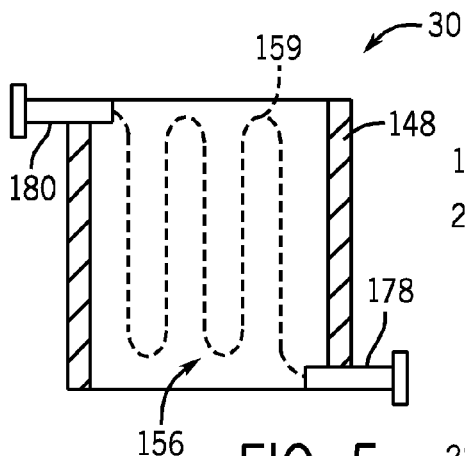
FIG. 5 is a cross-sectional side view of a portion of an embodiment of a syngas cooler.

FIGS. 3-5 show cross-sectional side views of alternate embodiments of the second syngas cooler section 30. Elements in FIGS. 3-5 in common with those shown in FIG. 2 are labeled with the same reference numerals. Specifically, FIG. 3 shows an embodiment of the second syngas cooler section 30 with the tubing 159 configured in a U-tube bundle, which may help facilitate superheating the saturated steam 28. Thus, the saturated steam 28 may enter the inlet header 178, pass through the U-tube bundle, and exit the outlet header 180. Such a configuration of the tubing 159 may provide certain heat transfer and/or mechanical advantages in certain applications. For example, a U-tube bundle may allow for differential thermal expansion between the shell and the tube bundle, may withstand thermal shock, and may be removed from one end for maintenance.

FIG. 4 shows an embodiment of the second syngas cooler section 30 with the tubing 159 configured in a helical manner, which may also help facilitate superheating the saturated steam 28. Specifically, the saturated steam 28 enters the inlet header 178, spirals through the helical tubing 158, and exits the outlet header 180. Such a configuration may be advantageous in particular applications. For example, a helical arrangement of the tubing 158 may be compact, provide higher film coefficients, and likely may not require expansion joints.

FIG. 5 shows an embodiment of the second syngas cooler section 30 with the tubing 159 configured in a multi-loop manner, which may help facilitate superheating the saturated steam 28. Specifically, the saturated steam 28 enters the inlet header 178, and winds up and down multiple times before exiting the outlet header 180. Such a configuration may possess heat transfer and/or mechanical properties different from the embodiments described above. In addition, other configurations of the tubing 159 may be used depending on the specifications of a particular application.

Figure 6:
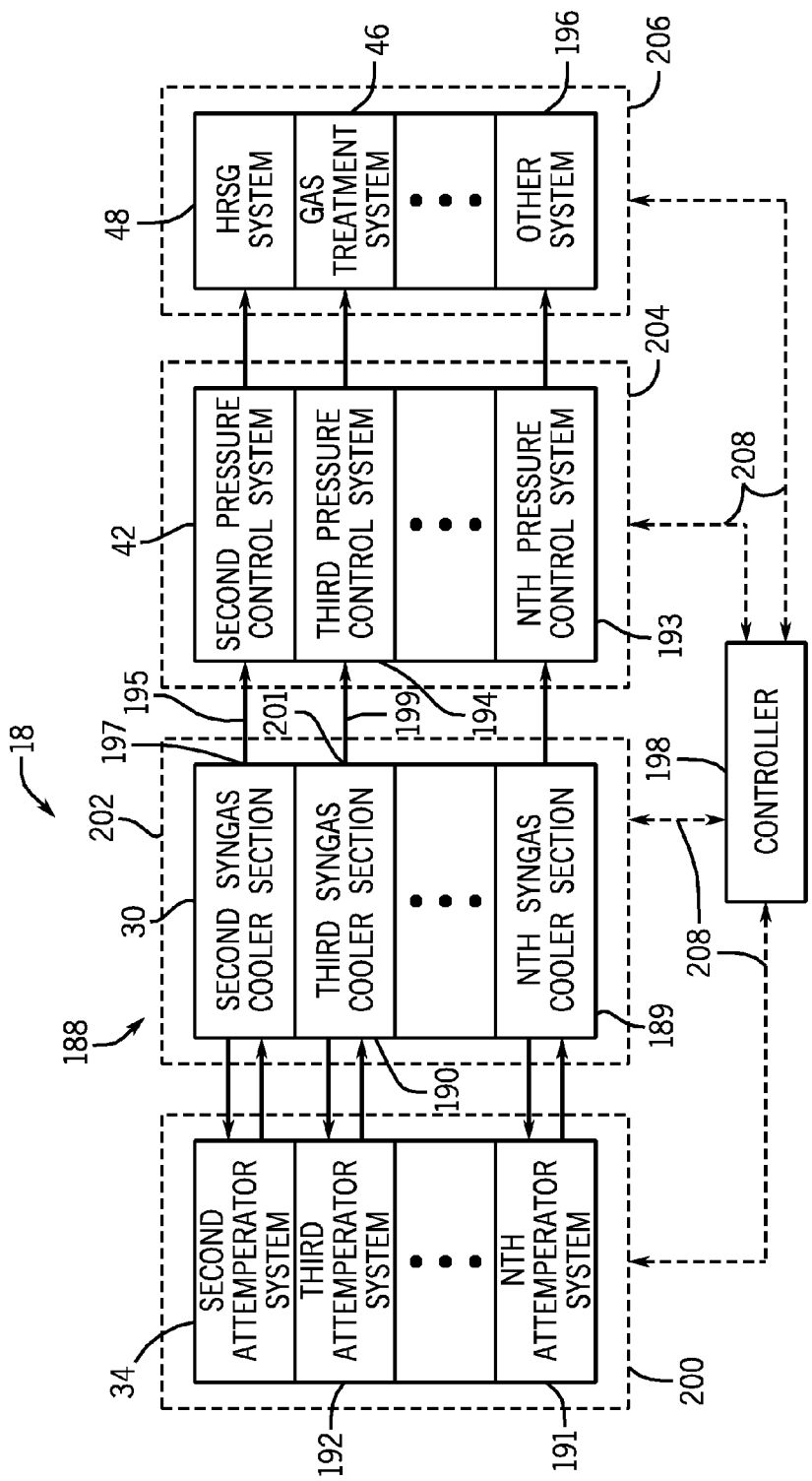
FIG. 6 is a block diagram of a portion of an embodiment of a syngas cooler.

FIG. 6 is a block diagram showing an embodiment of a multi-superheater syngas cooler system 188 integrated with the syngas cooler 18. Elements in FIG. 6 in common with those shown in FIG. 1 are labeled with the same reference numerals. For consistency, each set of related sections (e.g., syngas cooler section, attemperator system, and pressure control system) is referenced with a common numerical term (e.g., second, third, etc.) to include this relation. However, given that FIG. 6 relates to the second syngas cooler section 30 of FIGS. 1 and 2, the numerical term begins with second rather than first. This does not require correspondingly first sections or systems related to the first syngas cooler section 20 of FIGS. 2 and 3, although certain embodiments may include similar sections or systems in the first syngas cooler section 20 as well. In the illustrated embodiment, the system 188 includes the second syngas cooler section 30 coupled to the second attemperator system 34 and the second pressure control system 42, which function as described in detail above. In other words, the second syngas cooler section 30 superheats the saturated steam 28 from the first syngas cooler section 20 to generate a first superheated steam. The second pressure control system 42 may depressurize the first superheated steam and supply the depressurized steam to an input of the HRSG system 48.

The illustrated system 188 also includes a third syngas cooler section 190 below the second syngas cooler section 30, which may be may be coupled to a third attemperator system 192 and a third pressure control system 194. In certain embodiments, the first syngas cooler section 20, the second syngas cooler section 30, the third syngas cooler section 190, and the after cooler section 50 may be disposed in series one after another along the longitudinal flow path through the syngas cooler 18. The second and third syngas cooler sections 30 and 190 may be disposed axially between the first syngas cooler section 20 and the after cooler section 50 along the longitudinal flow path. In addition, the third syngas cooler section 190 may use saturated steam 28 or superheated steam 32 from the second syngas cooler section 30 as a coolant. For the same reasons described in detail above, the third attemperator system 192 may be used to reduce a temperature of a second superheated steam generated by the third syngas cooler section 190. The first superheated steam and the second superheated steam may have different temperatures, pressures, or enthalpies. In addition, a first steam connector 195 may be configured to output the first superheated steam through a first output 197 and a second steam connector 199 may be configured to output the second superheated steam through a second output 201. The first output 197 is independent from the third syngas cooler section 190 and the second output 201 is independent from the second syngas cooler section 30. The first and second steam connectors 195 and 199 may represent piping. The third pressure control system 194 may depressurize the second superheated steam generated by the third syngas cooler section 190 before being directed to an input of the gas treatment system 46, for example. In other embodiments, the second syngas cooler section 30 may supply the gas treatment system 46 and the third syngas cooler section 190 may supply the HRSG system 48.

Further, additional syngas cooler sections, up to N sections 189, may be included in the syngas cooler 18. Each additional syngas cooler section 189 may be coupled to an additional attemperator system 191 and/or an additional pressure control system 193. In some embodiments, a single pressure control system may be used for all of the syngas cooler sections. The superheated steam generated by these additional syngas cooler sections may be used in other systems 196 of the gasification system 10, or power generation system. In addition, the various superheated steam streams may be different from one another. For example, the second syngas cooler section 30 may include a first output (first superheated steam), the third syngas cooler section 190 may include a second output (second superheated steam), the Nth syngas cooler section 189 may include an Nth output (Nth superheated steam), and the outputs may be independent from one another. The various superheated steam streams may have the same or different characteristics, such as temperatures, pressures, enthalpies, steam qualities, and/or flow rates.

A controller 198 may be configured to control one or more aspects of the illustrated embodiment of FIG. 6. For example, the second attemperator system 34, the third attemperator system 192, and additional attemperator systems 191 may be collectively referred to as an attemperator system 200. Similarly, the second syngas cooler section 30, the third syngas cooler section 190, and additional syngas cooler sections 189 may collectively be referred to as a superheated steam system 202. The second pressure control system 42, the third pressure control system 194, and additional pressure control systems 193 may collectively be referred to as a pressure control system 204. Finally, the HRSG system 48, the gas treatment system 46, and other systems 196 may collectively be referred to as a steam consuming system 206. The controller 198 may send and/or receive signals 208 to/from the attemperator system 200, the superheated steam system 202, the pressure control system 204, and/or the steam consuming system 206. For example, the controller 198 may receive the signal 208 indicating that a temperature of the tubing 159 of the superheated steam system 202 exceeds a threshold. The controller 198 may send the signal 208 to the attemperator system 200 to help reduce the temperature of the tubing 159. As a further example, the controller 198 may receive the signal 208 from the steam consuming system 206 indicating that a pressure of superheated steam exceeds a threshold. The controller 198 may send the signal 208 to the pressure control system 204 to help reduce the pressure of the superheated steam. In addition, the controller 198 may be part of a larger controller used for the gasification system 10.

Figure 7:
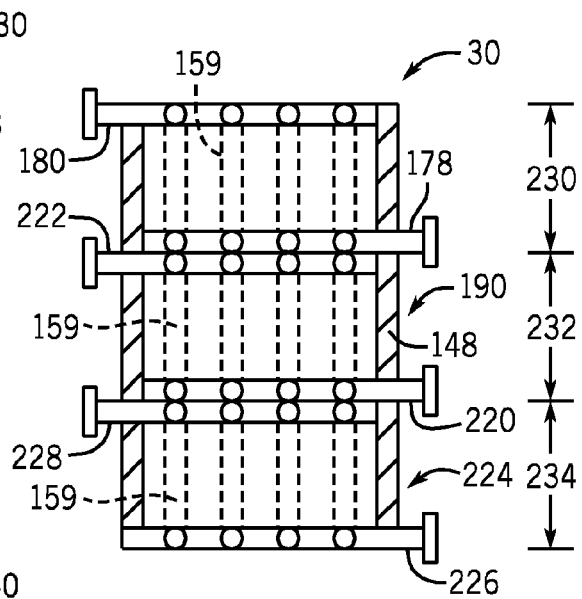
FIG. 7 is a cross-sectional side view of a portion of an embodiment of a syngas cooler.

FIG. 7 is a cross-sectional side view of an embodiment of the syngas cooler 18. Elements in FIG. 7 in common with those shown in earlier figures are labeled with the same reference numerals. In the illustrated embodiment, the second syngas cooler section 30 is located above the third syngas cooler section 190, which includes an inlet header 220 and an outlet header 222. Similarly, a fourth syngas cooler section 224 is located below the third syngas cooler section 190. The fourth syngas cooler section 224 includes an inlet header 226 and an outlet header 228. In the illustrated embodiment, the tube lengths of each of the syngas cooler sections 30, 190, and 224 are approximately the same. Specifically, the second syngas section 30 has a tube length 230, the third syngas cooler section 190 has a tube length 232, and the fourth syngas cooler section 224 has a tube length 234. The tube lengths 230, 232, and 234 are approximately the same. Thus, the heat transfer areas of each of the syngas cooler sections 30, 190, and 224 may also be approximately the same. Such a configuration of the syngas cooler sections 30, 190, and 224 may be advantageous for certain applications. In addition, manufacturing of the syngas cooler sections 30, 190, and 224 may be simplified, because each section is essentially the same. Further, the configuration of the tubing 159 in any of the syngas cooler sections may be similar to embodiments described in detail above. For example, the tubing 159 in the syngas cooler sections may be arranged differently, such as in coils, in a U-tube bundle, or in a winding up and down manner. In addition, the tubing 159 in the syngas cooler sections may have different diameters, tube wall thicknesses, lengths, sizes, patterns, orientations, materials of construction, and so forth.

Figure 8:
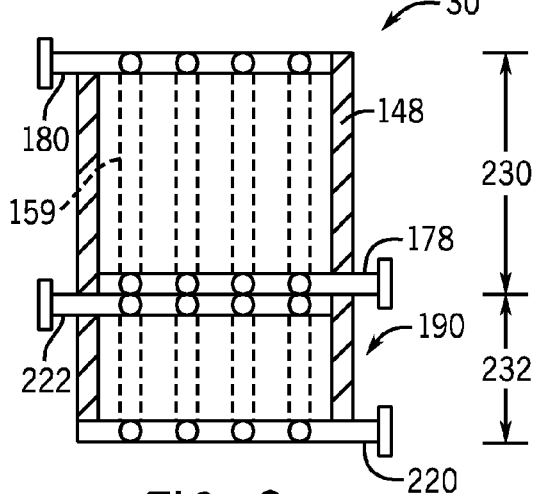
FIG. 8 is a cross-sectional side view of a portion of an embodiment of a syngas cooler.

FIG. 8 is a cross-sectional side view of another embodiment of the syngas cooler 18. Elements in FIG. 8 in common with those shown in earlier figures are labeled with the same reference numerals. In the illustrated embodiment, the tube length 230 of the second syngas cooler section 30 is greater than the tube length 232 of the third syngas cooler section 190. Thus, the heat transfer area of the second syngas cooler section 30 may be greater than the heat transfer area of the third syngas cooler section 190. If saturated steam 28 at the same pressure and temperature is directed to both the second and third syngas cooler sections 30 and 190, the superheated steam generated by the second syngas cooler section 30 may be at a higher temperature and/or pressure than the superheated steam generated by the third syngas cooler section 190. Such a configuration of the syngas cooler 18 may be used when superheated steam at different conditions is used in the gasification system 10. For example, the superheated steam from the second syngas cooler section 30 may be used in a process of the gasification system 10 that uses higher temperature superheated steam than a process using the superheated steam from the third syngas cooler section 190. In other embodiments, the tube length 230 of the second syngas cooler section 30 may be less than the tube length 232 of the third syngas cooler section 190. In further embodiments, the syngas cooler 18 may include more than two syngas cooler sections to generate superheated steam, with each syngas cooler section having different tube lengths from one another or with some syngas cooler sections having approximately the same tube lengths. In addition, the configuration of the tubing 159 in any of the syngas cooler sections may be similar to embodiments described in detail above. For example, the tubing 159 in the syngas cooler sections may have different diameters, tube wall thicknesses, lengths, sizes, patterns, orientations, materials of construction, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a syngas generator configured to generate a syngas;
a syngas cooler configured to cool the syngas, wherein the syngas cooler comprises:
  a first syngas cooler section including a first input and a first output, and configured to cool the syngas along a syngas path in a first shell of the first syngas cooler section and generate a saturated steam, wherein the first output outputs the saturated steam; and
  a second syngas cooler section including a second input and a second output, and configured to cool the syngas along the syngas path in a second shell of the second syngas cooler section and superheat the saturated steam to generate a first superheated steam with an enthalpy of less than approximately 3800 kJ/kg, wherein the second syngas cooler section is disposed along the syngas path downstream of the first syngas cooler section, and the first output is coupled to the second input; and
a steam user connected to the second output.

2. The system of claim 1, wherein a degree of superheat of the first superheated steam is between approximately 5 degrees Celsius and 360 degrees Celsius.

3. The system of claim 1, wherein the second syngas cooler section is configured to output the first superheated steam to an input of a component of a power generation system, and the component excludes a steam turbine.

4. The system of claim 1, wherein a capacity of the second syngas cooler section is configured to superheat a steam generated in the first syngas cooler section such that a pressure of a first portion of the first superheated steam is reduced to supply a heat exchanger, reactor, attemperator or a combination thereof at saturated conditions or with superheat, and a second portion of the first superheated steam is supplied to a heat recovery steam generation (HRSG) system without pressure reduction.

5. The system of claim 1, comprising an integrated pressure controller coupled to the second syngas cooler section, wherein the pressure controller is configured to control a steam drum pressure and to depressurize the first superheated steam.

6. The system of claim 1, wherein the second syngas cooler section comprises a plurality of independent outputs configured to output a plurality of superheated steam flows.

7. The system of claim 1, comprising a third syngas cooler section configured to cool the syngas along the syngas path and generate a second superheated steam, wherein the third syngas cooler section comprises a third output, the second and third outputs are independent from one another, and the third syngas cooler section is disposed along the syngas path downstream of the second syngas cooler section.

8. The system of claim 7, wherein the first superheated steam and the second superheated steam have different temperatures or pressures.

9. The system of claim 1, wherein the syngas cooler comprises an elongated enclosure having a longitudinal axis, and the first and second syngas cooler sections are disposed along the syngas path in series one after another along the longitudinal axis.

10. The system of claim 9, wherein the syngas cooler comprises an after cooler section, the second syngas cooler section is disposed along the syngas path axially between the first syngas cooler section and the after cooler section, and the after cooler section is configured to cool the syngas along the syngas path.

11. A system, comprising:
a gas fuel generator configured to generate a gas fuel;
a steam generator configured to generate a steam;
a gas fuel cooler configured to cool a gas fuel for power generation, wherein the gas fuel cooler comprises:
a first gas fuel cooler section including a first shell and a first tube, and configured to cool the gas fuel along a gas path in a first shell of the first gas fuel cooler section and generate a first superheated steam in the first tube of the first gas fuel cooler section, and the steam generator is coupled to the first tube;
a second gas fuel cooler section including a second shell and a second tube, and configured to cool the gas fuel along the gas path in the second shell of the second gas fuel cooler section and generate a second superheated steam in the second tube of the second gas fuel cooler section, wherein the second gas fuel cooler section is disposed along the gas path downstream of the first gas fuel cooler section, and the first tube is coupled to the second tube
a first steam connector configured to output the first superheated steam through the first tube; and
a second steam connector configured to output the second superheated steam through the second tube.

12. The system of claim 11, wherein the first superheated steam and the second superheated steam have different temperatures, pressures, or enthalpies.

13. The system of claim 11, wherein the first steam connector is configured to output the first superheated steam to a first component of a power generation system, the second steam connector is configured to output the second superheated steam to a second component of the power generation system, and at least one of the first or second component excludes a steam turbine.

14. The system of claim 11, wherein the first steam connector is configured to output the first superheated steam to a first component, the second steam connector is configured to output the second superheated steam to a second component, and at least one of the first or second component comprises a heat recovery steam generation (HRSG) system, a gas treatment system, a process heat exchanger, a reactor, an attemperator, or a combination thereof.

15. A system, comprising:
a gas cooler configured to cool a gas, wherein the gas cooler comprises:
an elongated enclosure having a longitudinal gas flow path;
a first gas cooler section disposed in the elongated enclosure, wherein the first gas cooler section is configured to cool the gas along the longitudinal gas flow path;
a second gas cooler section disposed in the elongated enclosure, wherein the second gas cooler section is configured to cool the gas along the longitudinal gas flow path and generate a first superheated steam;
a steam drum configured to provide a saturated steam from the first gas cooler section to the second gas cooler section;
a third gas cooler section disposed in the elongated enclosure along the longitudinal gas flow path, wherein the third gas cooler section is configured to cool the gas along the longitudinal gas flow path and generate a second superheated steam; and
an after cooler section disposed in the elongated enclosure, wherein the first gas cooler section, the second gas cooler section, and the after cooler section are disposed in series one after another along the longitudinal gas flow path, wherein the second gas cooler section is disposed axially between the first gas cooler section and the after cooler section along the longitudinal gas flow path.

16. The system of claim 15, wherein the first gas cooler section, the second gas cooler section, the third gas cooler section, and the after cooler section are disposed in the series one after another along the longitudinal gas flow path, wherein the second and third gas cooler sections are disposed axially between the first gas cooler section and the after cooler section along the longitudinal gas flow path.

17. The system of claim 15, wherein the second gas cooler section is configured to output the first superheated steam to an input of a heat recovery steam generation (HRSG) system, a gas treatment system, a process heat exchanger, a reactor, an attemperator, or a combination thereof, excluding a steam turbine.

* * * * *